United States Patent
Wuthnow et al.

(10) Patent No.: US 7,277,529 B1
(45) Date of Patent: Oct. 2, 2007

(54) SYSTEM AND METHOD FOR VOICE MAIL SERVICE IN AN ENVIRONMENT HAVING MULTIPLE VOICE MAIL TECHNOLOGY PLATFORMS

(75) Inventors: Mark Steven Wuthnow, Austin, TX (US); Danh Tan Lai, Fremont, CA (US); Brian Keith Rainer, Lawrenceville, GA (US); Richard Man-keung Tam, Austin, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 94 days.

(21) Appl. No.: 10/789,616

(22) Filed: Feb. 27, 2004

Related U.S. Application Data

(60) Provisional application No. 60/450,738, filed on Feb. 27, 2003.

(51) Int. Cl.
H04M 11/00 (2006.01)

(52) U.S. Cl. .................. 379/88.14; 379/88.17; 379/88.18; 379/88.26; 455/413

(58) Field of Classification Search ............ 379/88.08, 379/88.14, 88.17, 88.18, 88.26; 455/413
See application file for complete search history.

(56) References Cited

U.S. PATENT DOCUMENTS

| | | | | |
|---|---|---|---|---|
| 5,029,199 | A | * 7/1991 | Jones et al. | 379/88.26 |
| 5,193,110 | A | * 3/1993 | Jones et al. | 379/93.14 |
| 5,325,310 | A | 6/1994 | Johnson et al. | |
| 5,457,732 | A | 10/1995 | Goldberg | |
| 5,572,583 | A | * 11/1996 | Wheeler et al. | 379/221.09 |
| 5,724,407 | A | * 3/1998 | Bruno et al. | 379/88.13 |
| 5,742,668 | A | 4/1998 | Pepe et al. | |
| 5,751,791 | A | * 5/1998 | Chen et al. | 379/88.13 |
| 5,838,768 | A | * 11/1998 | Sumar et al. | 379/88.14 |
| 5,856,825 | A | 1/1999 | Yumoto et al. | |
| 5,878,230 | A | 3/1999 | Weber et al. | |
| 5,930,239 | A | 7/1999 | Turcotte | |
| 6,006,189 | A | 12/1999 | Strawczynski et al. | |
| 6,032,039 | A | 2/2000 | Kaplan | |
| 6,085,068 | A | 7/2000 | Eaton et al. | |
| 6,119,014 | A | 9/2000 | Alperovich et al. | |

(Continued)

OTHER PUBLICATIONS

MOTOROLA, Motorola Multimedia Messaging Service product information, undated, available at http://www.motorola.com/networkoperators/pdfs/VAS-MMSC.pdf.

(Continued)

*Primary Examiner*—Fan Tsang
*Assistant Examiner*—Hemant S. Patel
(74) *Attorney, Agent, or Firm*—Gardner Groff Greenwald & Villanueva, P.C.

(57) ABSTRACT

Voice mail service in an environment having multiple voice mail technology platforms is provide by an Automatic Message Attendant (AMA) device and a subscriber profile database. The AMA device has a platform selector element that queries the subscriber profile database for voice mail technology platform indicator information, which it then uses to select a voice mail technology platform. Additionally, the AMA device may also have a greeting player and message recorder element that queries an announcement database, and a content adapter element that queries a message format requirement database. Thus, the AMA device may also provide call termination functionality by playing a greeting and recording a message from the caller, and converting the recorded message into a format suitable for use with the selected voice mail technology platform.

25 Claims, 6 Drawing Sheets

U.S. PATENT DOCUMENTS

| | | | |
|---|---|---|---|
| 6,181,781 B1 | 1/2001 | Porter et al. | |
| 6,219,542 B1 | 4/2001 | Aas et al. | |
| 6,363,339 B1 | 3/2002 | Rabipour et al. | |
| 6,389,276 B1 | 5/2002 | Brilla et al. | |
| 6,393,288 B1 | 5/2002 | Sollee et al. | |
| 6,408,191 B1 | 6/2002 | Blanchard et al. | |
| 6,418,306 B1 | 7/2002 | McConnell | |
| 6,421,707 B1 * | 7/2002 | Miller et al. | 709/206 |
| 6,480,712 B1 | 11/2002 | Vigil | |
| 6,560,318 B1 * | 5/2003 | Spielman et al. | 379/88.12 |
| 6,628,761 B1 | 9/2003 | Adamczyk et al. | |
| 6,640,097 B2 | 10/2003 | Corrigan et al. | |
| 6,665,378 B1 * | 12/2003 | Spielman et al. | 379/88.12 |
| 6,668,049 B1 | 12/2003 | Koch et al. | |
| 6,671,355 B1 * | 12/2003 | Spielman et al. | 379/88.12 |
| 6,693,652 B1 | 2/2004 | Barrus et al. | |
| 6,714,859 B2 | 3/2004 | Jones | |
| 6,731,942 B1 | 5/2004 | Nageli | |
| 6,807,259 B1 | 10/2004 | Patel et al. | |
| 6,832,243 B1 | 12/2004 | Mikalsen et al. | |
| 2001/0034226 A1 | 10/2001 | Watanabe et al. | |
| 2002/0160756 A1 | 10/2002 | Amin | |
| 2002/0177455 A1 | 11/2002 | Lehto et al. | |
| 2003/0068019 A1 * | 4/2003 | Colemon | 379/88.19 |
| 2003/0126263 A1 | 7/2003 | Fenton et al. | |
| 2003/0228863 A1 | 12/2003 | Veen et al. | |
| 2003/0233580 A1 | 12/2003 | Keeler et al. | |
| 2004/0023643 A1 | 2/2004 | Veen et al. | |
| 2004/0085360 A1 | 5/2004 | Pratt et al. | |

OTHER PUBLICATIONS

Openwave Systems, Inc., Openwave Multimedia Messaging Service Center product information web page; 2000-2003, downloaded at http://www.openwave.com/us/products/mobile/operator_products/multimedia_messaging_service_center/index.htm on Feb. 17, 2004.

Nokia, Are you ready for Multimedia Messaging Service—An evolutionary approach to implementing MMS, white paper, 2002, available at http://www.motorola.com/networkoperators/pdfs/VAS - MMSC.pdf.

Tenet Technologies, Unified Multimedia Messaging Service (UMMS) Server, undated, Bangalore, India, available at http://www.tenetindia.com/PDF/UMMS.pdf.

OPENWAVE, Openwave Vocie Messaging, printed from the Internet on Nov. 17, 2004, 2 pages, date of firts publication unknown, printed from www.openwave.com/us/products/mobile/operator_products.

OPENWAVE, Operator Products, printed from the internet on Nov. 17, 2004, 2 pages, date of first publication unknown, printed from www.openwave.com/us/products/mobile/operator_products.

* cited by examiner

SYSTEM AND METHOD FOR VOICE MAIL SERVICE IN AN ENVIRONMENT HAVING MULTIPLE VOICE MAIL TECHNOLOGY PLATFORMS

CROSS-REFERENCE TO RELATED APPLICATIONS

This application claims the benefit of U.S. Provisional Patent Application No. 60/450,738, filed Feb. 27, 2003, which is entirely incorporated herein by reference.

BACKGROUND OF THE INVENTION

1. Field of Invention

This invention relates to voice mail service. More particularly, the invention relates to a system and method for providing voice mail service in an environment having multiple voice mail technology platforms.

2. Description of Related Art

Voice mail is an extremely useful business and personal tool that allow callers to leave voice messages when the called party is not available to take an incoming call directly. As such, voice mail has been implemented by many telephone carriers, both wireline and wireless, as an additional benefit for their subscribers.

In a typical wireless application, a call to a wireless subscriber is routed to the subscriber's home Mobile Switching Center (MSC). If the subscriber's wireless terminal is not on the network or if the subscriber does not respond to a call page over the Public Land Mobile Network (PLMN), the MSC forwards the call and information regarding the subscriber, including the subscriber's phone number, to a Network-based Voice Mail System (NVMS). The NVMS then records a message from the caller and stores the message in a "mailbox" associated with the subscriber's identity (e.g. phone number) for later retrieval by the subscriber.

A typical wireline application would mirror the wireless application using equivalent wireline telecommunication system elements.

Recently, with the development of Multimedia Messaging Service (MMS), telephone carriers have proposed using MMS to deliver voice mail messages in the form of voice clips directly to the subscriber's MMS-capable terminal. The MMS-capable terminal could be either a wireless or wireline terminal. The voice mail message would then be stored on the memory of the MMS-capable terminal. Once the message is on the terminal, the user can access it whenever and wherever they want, without issues such as wireless coverage or airtime usage.

However, there are advantages and disadvantages that exist with respect to both NVMS and MMS voice mail service.

For instance, when there is a new message in a NVMS mailbox, the NVMS will generate a notification to alert the subscriber regarding the presence of the new message. Upon receiving the notification, the subscriber must-call into the NVMS, go through an identification and authentication process, and interact with the VMS before accessing the voice mail message. This process is confusing to some subscribers, as NVMS questions continually rank at the top of the list of reasons that subscribers call customer service. Delivery of voice mail messages in the form of voice clips directly to the subscriber's wireless terminal using MMS eliminates the identification, authentication and interaction process of NVMS.

Wireless service carriers often provide NVMS service at "no charge" and depend on subscriber air-time usage for accessing their NVMS mailbox to pay for the NVMS costs, including, for example, the purchase, maintenance, support and operation of the NVMS. Some subscribers never activate their NVMS mailbox, and others receive only a few messages per billing cycle, which does not allow the wireless carrier to recover the NVMS costs for that subscriber. With MMS voice mail service, voice mail messages are stored on the MMS terminal, thus eliminating the costs associated with NVMS.

However, MMS based voice mail service also has limitations and constraints that give rise to problems for subscribers and wireless carriers.

For instance, MMS terminals have limited storage capacity, which limits the number of voice mail messages that can be stored on the terminal. Thus, MMS based voice mail service is not practical for subscribers that receive a large number of voice mail messages on a regular basis. For subscribers that receive a large number of voice mail messages, NVMS provides the capacity to meet those needs.

Also, as mentioned earlier, wireless service carriers may depend on subscriber air-time usage for accessing their NVMS to pay for the NVMS costs. However, with MMS based voice mail service, there is no air-time usage to generate revenue and wireless carriers would either have to charge subscribers for voice mail message delivery, or absorb the cost. For low volume subscribers, the cost for MMS delivery of a few voice mail messages is low compared with the costs of NVMS service. But for high volume subscribers, the NVMS service is more economical for the wireless carriers and supports "no charge" service for the subscribers.

Neither NVMS voice mail service nor MMS based voice mail service meets all of the various described subscriber and carrier needs. Further, it is anticipated that as other technologies are developed and implemented for voice mail service, there will still be various needs that are better met by alternate technologies. Thus, there is a need for a system and method for providing voice mail service in an environment having multiple voice mail technology platforms, where the voice mail platform can be custom selected based on the various needs of the subscribers and the carriers.

SUMMARY OF THE INVENTION

The present invention solves these needs, and others, by providing a system and method for providing voice mail service in an environment having multiple voice mail technology platforms. The invention provides an Automatic Message Attendant (AMA) device which, advantageously, can be positioned on the front end of the multiple voice mail technology platforms. Additionally, the AMA device may perform the greeting and record functions of a voice mail system, thereby removing those functions from the voice mail platforms or allowing systems not having such functions to be used for voice mail service.

Generally described, a system of the invention includes a subscriber profile database relating voice mail technology platform indicator information for a plurality of subscribers to corresponding subscriber identities, and an Automatic Message Attendant device. The AMA device has a platform selector element. The subscriber profile database is in communication with the platform selector element. The platform selector element is operative to receive call information regarding a call to a subscriber, where the call information includes the identity, i.e. the telephone number, of the subscriber to whom the call was placed. Additionally, the platform selector element is also operative to obtain voice mail technology platform indicator information from the subscriber profile database by utilizing the subscriber identity. Lastly, the platform selector element operates to select a voice mail technology platform by using the voice mail technology platform indicator information obtained from the subscriber profile database.

More specifically, the system of the invention may have a common signaling network, where the platform selector element is in communication with the common signaling network. In this configuration, the platform selector element will receive the call information through the common signaling network from a communications switch. Then, the platform selector element may operate to provide a routing address for the selected voice mail technology platform to the communications switch through the common signaling network.

Alternatively, in accordance with another aspect of the invention, the automatic message attendant device may operate as a pass-through switch to connect the caller with the selected voice mail technology platform.

In accordance with yet another aspect of the invention, the system may further have an audio announcement database which relates personal greeting information for a plurality of subscribers to the corresponding identities of those subscribers. This personal greeting information may be a recorded greeting from the subscriber or system greeting information. The automatic message attendant device may further have a greeting player and message recorder element which is in communication with the audio announcement database and the platform selector element. In this configuration, the greeting player and message recorder element operates to obtain the personal greeting information for the subscriber from the audio announcement database using the subscriber's identity. Then the greeting player and message recorder element will play a greeting to the caller as indicated by the personal greeting information and record a voice mail message from the caller to the subscriber. Advantageously, the system may then either forward the recorded message to the selected voice mail technology platform, or forward it to a content adapter element of the AMA device.

Thus, in another implementation, the AMA device may further have a content adapter element, and the system may further have a message format requirement database. The message format requirement database would contain message format requirement information corresponding to subscribers to the system. The content adapter element would be in communication with the message format requirement database. Further, in this implementation, the content adapter element attains the message format requirement format information for the subscriber from the message format requirement database utilizing the subscriber identity, and converts the recorded voice mail message to the format indicated by the message format requirement information. The content adapter element may then forward the formatted message to the selected voice mail technology platform.

Generally, a method of the invention utilizes a subscriber profile database which contains voice mail technology platform indicator information associated with a number of subscribers. An Automatic Message Attendant (AMA) device then receives information regarding a call from a caller to be directed to a voice mail technology platform. The call information includes an identity (e.g. phone number) of the subscriber to whom the call was placed. Then, the AMA device obtains the voice mail technology platform indicator information from the subscriber profile database using the subscriber identity. With this information, the AMA device then selects a voice mail system platform. Upon selection of the voice mail system platform, the AMA device may then direct the caller to the selected voice mail technology platform. This step of directing the caller to the platform may include either providing a routing address for the selected platform to a communications switch through a common signaling network, or connecting said caller directly to the selected voice mail technology platform.

Alternatively, rather than directing the caller to the selected platform, the AMA device may additionally obtain personal greeting information for the subscriber from an announcement database, play a greeting to the caller as indicated by the personal greeting information, and record a voice mail message from the caller to the subscriber. Thus, the greet and record function may be performed in the AMA device. Then, the recorded message may be forwarded to either the selected voice mail technology platform, or a content adapter element.

Thus, in accordance with another aspect of the invention, the AMA device may also have a content adapter element and the method may include additional steps to perform a content adaptation function. These additional steps include obtaining message format requirement information for the subscriber from a message format requirement database, and converting the recorded voice mail message to the format indicated by the message format requirement information. Then, the converted message may be forwarded to the selected voice mail technology platform.

Thus, the invention provides a system and method for providing voice mail service in an environment having multiple voice mail technology platforms, where the voice mail platform can be custom selected based on the various needs of the subscribers and the carriers.

The invention is not limited to the preceding description and will be better understood by reference to the following detailed description and the appended drawings and claims.

DETAILED DESCRIPTION OF EXEMPLARY EMBODIMENTS

Figure 1:
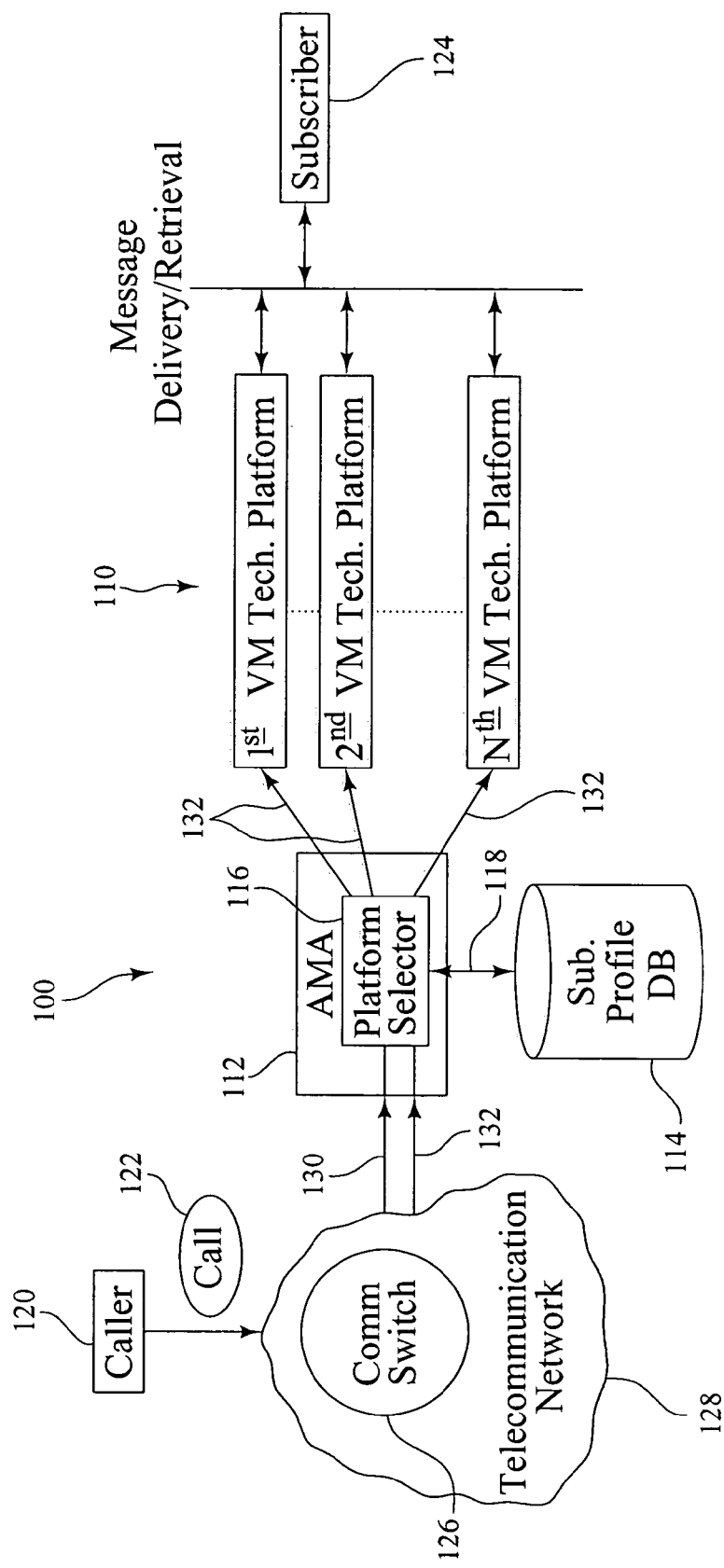
FIG. 1 is a functional block diagram of an exemplary system according to the invention.

A system or method in accordance with the present invention may be used to provide voice mail service in any environment having multiple voice mail technology platforms. The invention provides an Automatic Message Attendant (AMA) device having a platform selection element placed between the caller and the multiple voice mail technology platforms. The AMA device can serve a switching function, physically relaying a call from a communication switch to the selected voice mail technology platform, or the AMA device can serve a director function, providing routing instructions over a common signaling network, such as a SS7 network, so that the call can be routed from the communication switch to the selected voice mail technology platform.

The platform selection function is accomplished by receiving information regarding a call forwarded from a communication switch upon a triggering event, such as a failure to answer the call within a predetermined amount of time, or if a mobile terminal is not available on, or in range of, a wireless network. The AMA device can then obtain profile information for the subscriber to whom the call was placed that indicates the voice mail technology platform used for voice mail for the subscriber, and select the voice mail technology platform as indicated by the profile information. The profile information is located in a subscriber profile database, which can be provisioned based on the voice mail technology needs of the subscriber and carrier.

The present invention applies to telecommunication systems which may be implemented using a variety of technologies, including but not limited to electrical and electronic systems using microprocessors and other processing components, and software and other collections of steps and instructions, for implementing processes in conjunction with such systems. The embodiments described herein are exemplary. Thus, although some specific technologies are discussed, other equivalent technologies could be used to implement systems and methods in keeping with the spirit and teachings of the present invention. Additionally, unless otherwise noted, references to apparatus or data structures for conveying a signal or information are intended to refer generally to all functionally equivalent apparatus and data structures.

The exemplary voice mail technology platforms discussed herein include: 1) a Network-based Voice Mail System (NVMS); 2) a MMS-based Voice Mail System (MMS VMS), both of which are capable of call termination, and 3) a system which uses Multimedia Messaging Services Center (MMSC) architecture to provide voice clip delivery. However, the principles taught herein will apply to any environment having multiple voice mail technology platforms. For the purpose of this discussion, a voice mail technology platform is a system capable of providing voice mail service for a subscriber in any form.

As described above, a Network-based Voice Mail System (NVMS) receives a call and the identity of the subscriber to whom the call was placed. The call is forwarded from a communication switch in the carrier's network. Typically, the call is forwarded over a trunk connection between the switch and the NVMS, such as a Multi-Frequency (MF) trunk connection. However, the call could be forwarded over a single line or any other mechanism for connecting the caller to the NVMS. The subscriber identity can be transmitted using in-band or out-of-band signaling, such as through the use of a common signaling network (SS7 or the equivalent). The communication switch could be any switching component of a telecommunication system, such as a switching office in a wireline system, or a Mobile Switching Center (MSC) in a wireless system. The call would be forwarded upon a triggering event, such as a failure to answer the call within a predetermined amount of time, or if a mobile terminal is not available on, or in range of, a wireless network. The NVMS then terminates the call by playing a greeting to the caller, recording a message from the caller, and storing the message in a "mailbox" associated with the subscriber's identity. The subscriber can then access the mailbox via a communication system, such as a Public Switched Telephone Network (PSTN) or a Public Land Mobile Network (PLMN), to retrieve the stored message.

A MMS Voice Mail System (MMS VMS) operates in much the same way as a NVMS, receiving a call and the identity of the subscriber to whom the call was placed from a communication switch, and terminating the call by playing a greeting to the caller and recording a message from the caller. However, rather than storing the message, the MMS VMS delivers the message directly to the subscriber's MMS-capable terminal in the form of a voice clip. The MMS-capable terminal can be any wireless or wireline MMS-capable communication device, such as a telephone, a Personal Digital Assistant (PDA), or a Personal Computer (PC).

The Multimedia Messaging Services Center (MMSC) architecture provides a store and forward facility for multimedia messages (e.g. in the form of voice clips) that have already been captured or recorded. The MMSC architecture supports general text, audio, images, and video format messages.

As a result of its location on the front end of the voice mail technology platforms, the invention itself may also provide call termination, greeting player and message recorder functions, and capabilities for forwarding the recorded message to the selected voice mail technology platform via a data connection, such as an IP or X.25 connection. Thus, the AMA device may advantageously be used in connection with a MMSC architecture in order to enable the MMSC architecture platform to serve in a Voice Mail System. Furthermore, content adaptation may advantageously be performed at this front end location in order to put the recorded message into a format acceptable to the subscriber's MMS-capable terminal. Thus, carriers are able to add the AMA device as a front-end intelligent adjunct to their existing NVMS, MMS VMS, and MMSC platforms in order to create a flexible system having multiple voice mail technology platforms.

The mechanism for delivery of the voice mail message from the selected voice mail system platform to the subscriber can be any type of communication network. For example, delivery of the voice mail message can be by any known wireless or wireline technology, such as: Global System for Mobile Communications (GSM); Code Division Multiple Access (CDMA); Time Division Multiple Access (TDMA); Wireless Fidelity (WiFi); General Packet Radio Service (GPRS); Enhanced Data for GSM Evolution (EDGE); Wideband CDMA (WCDMA); Plain Old Telephone Service (POTS); Integrated Services Digital Network (ISDN); and Digital Subscriber Line (DSL).

As shown in FIG. 1, an exemplary system 100 for providing voice mail service in an environment having multiple voice mail technology platforms 110 includes an Automatic Message Attendant (AMA) device 112 and a subscriber profile database 114. The AMA device 112 has a platform selector element 116. The platform selector element 116 is in communication with the subscriber profile database 114 via an appropriate data link 118, such as a Lightweight Directory Access Protocol (LDAP) link or an internal bus connection in the event that the database 114 is integrated with the platform selector element 116. The subscriber profile database 114 is provisioned with voice mail technology platform indicator information for subscribers.

In operation, a caller 120 places a call 122 to a subscriber 124. The call 122, or information about the call, reaches a communication switch 126 through a telecommunication network 128 for connection of the caller 120 to the subscriber 124. However, upon a triggering event which indicates that the caller 120 should be connected to a voice mail system, the communication switch 126 will deliver information about the call to the AMA device 112, or, more particularly, to the platform selector element 116. The call information delivery is accomplished through an appropriate signaling means 130, such as in-band signaling over the call circuit or out-of-band signaling, such as over a common signaling network (i.e. a SS7 network or the equivalent). The call information includes an identity (e.g. phone number) of the subscriber to whom the call was placed. The platform selector element 116 then obtains profile information for the subscriber 124 from the subscriber profile database 114. The profile information includes the voice mail technology platform indicator information for the subscriber 124. The platform selector element 116 then selects a voice mail system platform 110 by using the voice mail technology platform indicator information. The call 122 and the subscriber identity can then be delivered by an appropriate delivery system architecture 132 to the appropriate voice mail technology platform for providing voice mail service for the subscriber 124.

Figure 2:
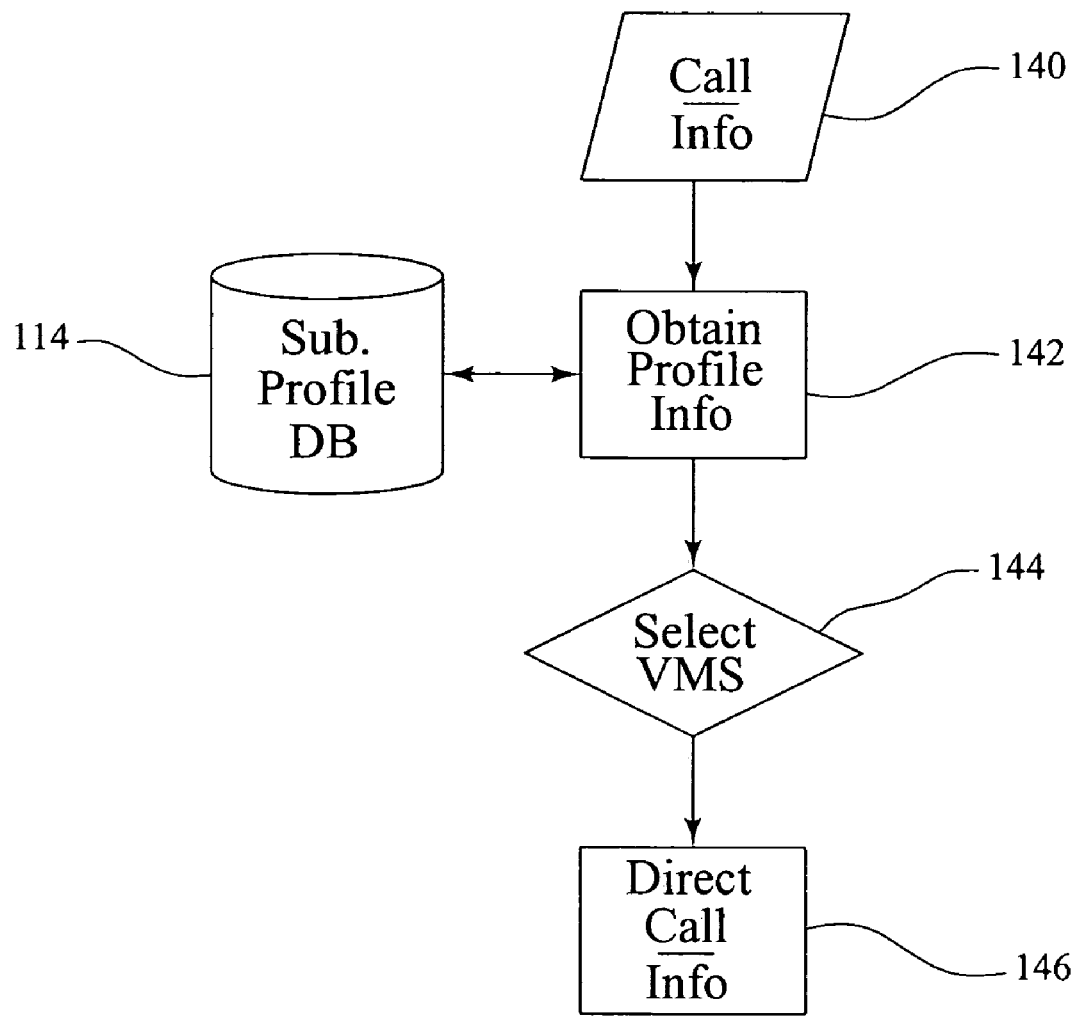
FIG. 2 is a logic flow diagram of an exemplary method of the invention.

Thus, FIG. 2 shows the logical flow of a method used in the exemplary system 100 of FIG. 1. In the first step 140, the AMA device 112 receives call information from a communication switch 126, where the call information includes the identity (e.g. the telephone number) of the subscriber to whom the call was placed. In the next step 142, the AMA device 112 queries the subscriber profile database 114 for profile information for the subscriber 124, where the profile information includes voice mail technology platform indicator information for the subscriber. In the next step 144, the AMA device 112 selects a voice mail technology platform using the voice mail technology platform indicator information obtained in the previous step 142. In the last step 146, the AMA device 112 directs the delivery of the call 122, and the identity of the subscriber to whom the call was placed, to the selected voice mail technology platform for call termination.

There are multiple delivery system architectures 132 that can be utilized by the system 100, such as a Service Control Point (SCP)-type/IN architecture or a service node architecture. In a SCP-type/IN architecture, the AMA device 112 could return a routing address for the selected voice mail technology platform to the communication switch 126, so that the call 122 could be routed directly to the selected voice mail technology platform. In the service node architecture, the AMA device 112 could serve as a pass-through switch, passing the call 122 through the AMA device 112 to the selected voice mail technology platform or to another call termination element for use with a MMSC platform, as described below.

Figure 3:
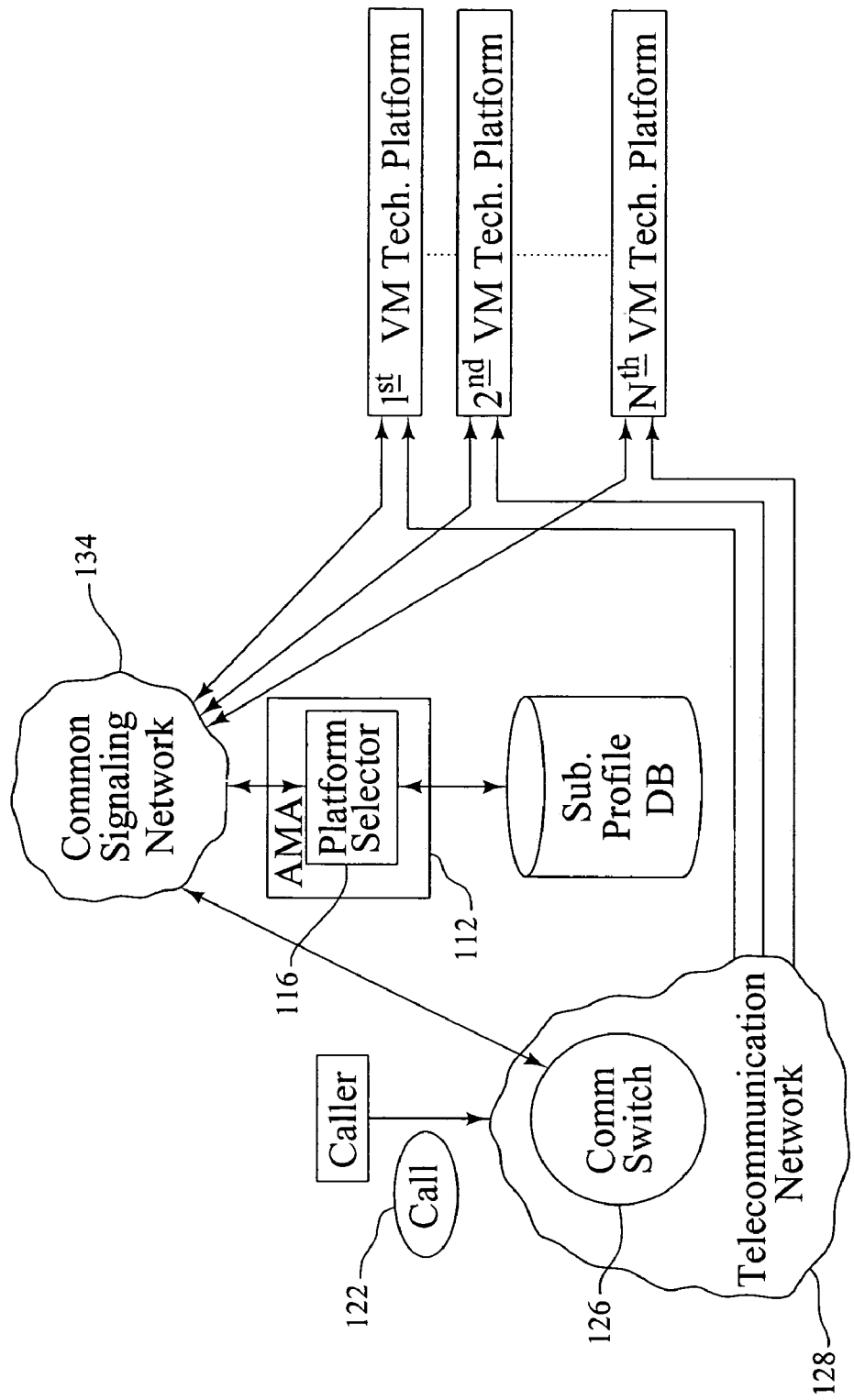
FIG. 3 is a diagram of an embodiment of the invention incorporating the functionality of FIG. 1, showing an example of a delivery system architecture.

FIG. 3 illustrates an exemplary embodiment of the present invention using a SCP-type/IN delivery architecture wherein the necessary signaling is accomplished through a common signaling network 134, such as a SS7 network. In this example, the AMA device 112 provides the routing address for the selected voice mail technology platform to the communication switch 126 through the common signaling network 134. The call 122 can then be routed to the selected voice mail technology platform through the telecommunication network 128, which could be a PSTN or a PLMN.

Figure 4:
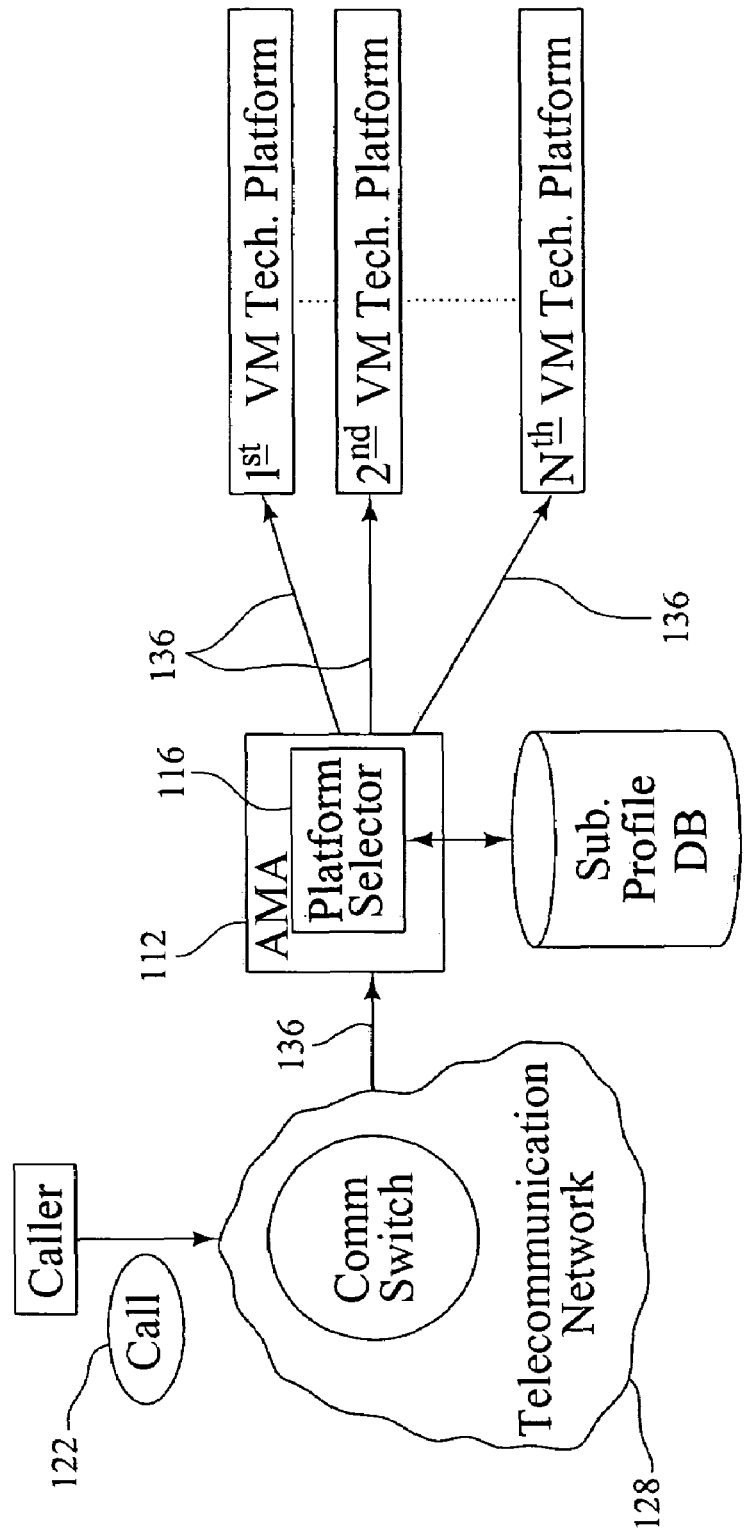
FIG. 4 is a diagram of another embodiment of the invention incorporating the functionality of FIG. 1, showing an example of another delivery system architecture.

FIG. 4 illustrates an exemplary embodiment of the present invention using a service node type delivery architecture wherein the AMA device 112 acts as a pass-through switch, delivering the call 122 to the selected voice mail technology platform with appropriate connections 136 through the AMA device 112. Such connections 136 could be trunk-type connections, such as MF connections, or individual lines. In this example, the necessary signaling may be accomplished as either in-band signaling or out-of-band signaling (not shown).

Figure 5:
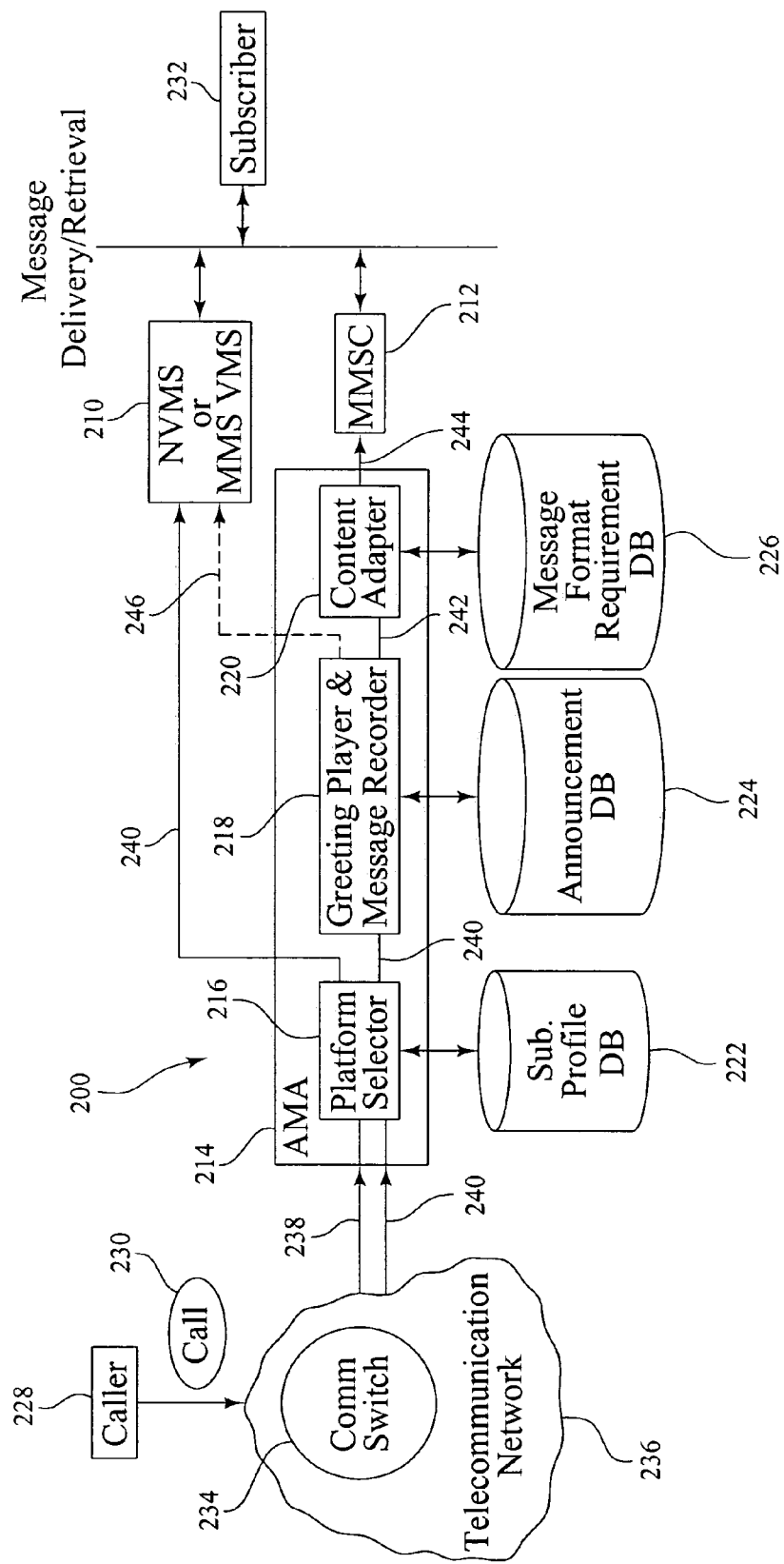
FIG. 5 is a diagram of another exemplary system according the invention.

FIG. 5 shows another exemplary system 200 for providing voice mail service in an environment having multiple voice mail technology platforms 210, 212. The system 200 of FIG. 5 incorporates the elements and features of the system 100 of FIG. 1 and adds expanded functionality. In particular, the system 200 is shown with one voice mail technology platform being a NVMS or MMS VMS platform 210, and with another platform being a MMSC architecture platform 212, such as might be present in many telecommunication carrier systems. The system 200 includes an AMA device 214. The AMA device 214 has a platform selector element 216, a greeting player and message recorder element 218, and a content adapter element 220. Additionally, the system 200 includes: a subscriber profile database 222 in communication with the platform selector element 216; an announcement database 224 in communication with the greeting player and message recorder element 218, and a message format requirement database 226 in communication with the content adapter element 220. All of the database connections are achieved through appropriate data links, such as LDAP protocol links or internal bus connections in the event of integration with their respective elements. The subscriber profile database 222 is provisioned with voice mail technology platform indicator information for subscribers. The announcement database 224 is provisioned with personal or system greeting information for subscribers. The message format requirement database 226 is provisioned with message format requirement information for subscribers, for the purpose of content adaptation.

In operation, a caller 228 places a call 230 to a subscriber 232. The call 230, or information about the call, reaches a communication switch 234 through a telecommunication network 236 for connection of the caller 228 to the subscriber 232. Upon a triggering event which indicates that the caller 228 should be connected to a voice mail system, the communication switch 234 will deliver information about the call to the AMA device 214, or, more particularly, to the platform selector element 216. The call information delivery is through an appropriate signaling means 238, such as in-band signaling over the call circuit or out-of-band signaling, such as over a common signaling network (i.e., a SS7 network or the equivalent). The call information includes an identity (e.g., phone number) of the subscriber to whom the call was placed. The platform selector element 216 then obtains profile information for the subscriber 232 from the subscriber profile database 222 using the subscriber identity. The profile information includes voice mail technology platform indicator information for the subscriber 232. The platform selector element 216 then selects a voice mail technology platform by using the voice mail technology platform indicator information.

If the selected voice mail technology platform is the NVMS or MMS VMS platform 210, the call 230 and the subscriber identity can then be delivered by an appropriate delivery system architecture 240, such as described earlier, for call termination at the selected platform 210.

However, if the selected voice mail technology platform is the MMSC architecture platform 212, the subscriber identity will be delivered to and the caller 228 will be connected with the greeting player and message recorder element 218. The greeting player and message recorder element 218 then obtains personal or system greeting information for the subscriber 232 from the announcement database 224 using the subscriber identity. The greeting player and message recorder element 218 then plays the subscriber's personal or system greeting to the caller 228, and records a message from the caller 228. Thus, the greeting player and message recorder element 218 provides termination of the call, much like the NVMS or MMS VMS platform 210 does. Once recorded, the greeting player and message recorder element 218 can forward the message and the subscriber identity to the content adapter element 220 over an appropriate data link 242, or, directly to the MMSC architecture voice mail platform 212 (not shown).

The message may be directed to the content adapter element 220 since various MMS-capable terminals may have differing voice clip message format requirements. The content adapter element 220 may then obtain message format requirement information for the subscriber 232 (or, more accurately, the subscriber's MMS-capable terminal) from the message format requirement database 226 using the subscriber identity. The content adapter element 220 then converts the recorded voice mail message to the format indicated by the message format requirement information. Once converted, the content adapter element 220 can forward the formatted message and the subscriber identity to the MMSC 212 for delivery to the subscriber 232 (or to the subscriber's MMS-capable terminal) over an appropriate data link 244, such as an IP protocol or an X.25 protocol link.

Another possible configuration shown on FIG. 5 is moving the call termination function from the NVMS or MMS VMS platform 210 to the greeting player and message recorder element 218, and delivering the recorded message and the subscriber identity to the NVMS or MMS VMS platform 210 over an appropriate data link 246.

Additionally, it should be noted that the content adapter element 220 could be combined with the greeting player and message recorder element 218, such that the combined greeting player, message recorder and content adapter element (not shown) would deliver a properly formatted message to the selected voice mail technology platform over an appropriate data link.

Further still, the content adapter function could be moved to the selected voice mail technology platform, such that the voice mail platform would receive the recorded message from the greeting player and message recorder element 218 and perform any necessary content conversion at the voice mail platform.

Figure 6:
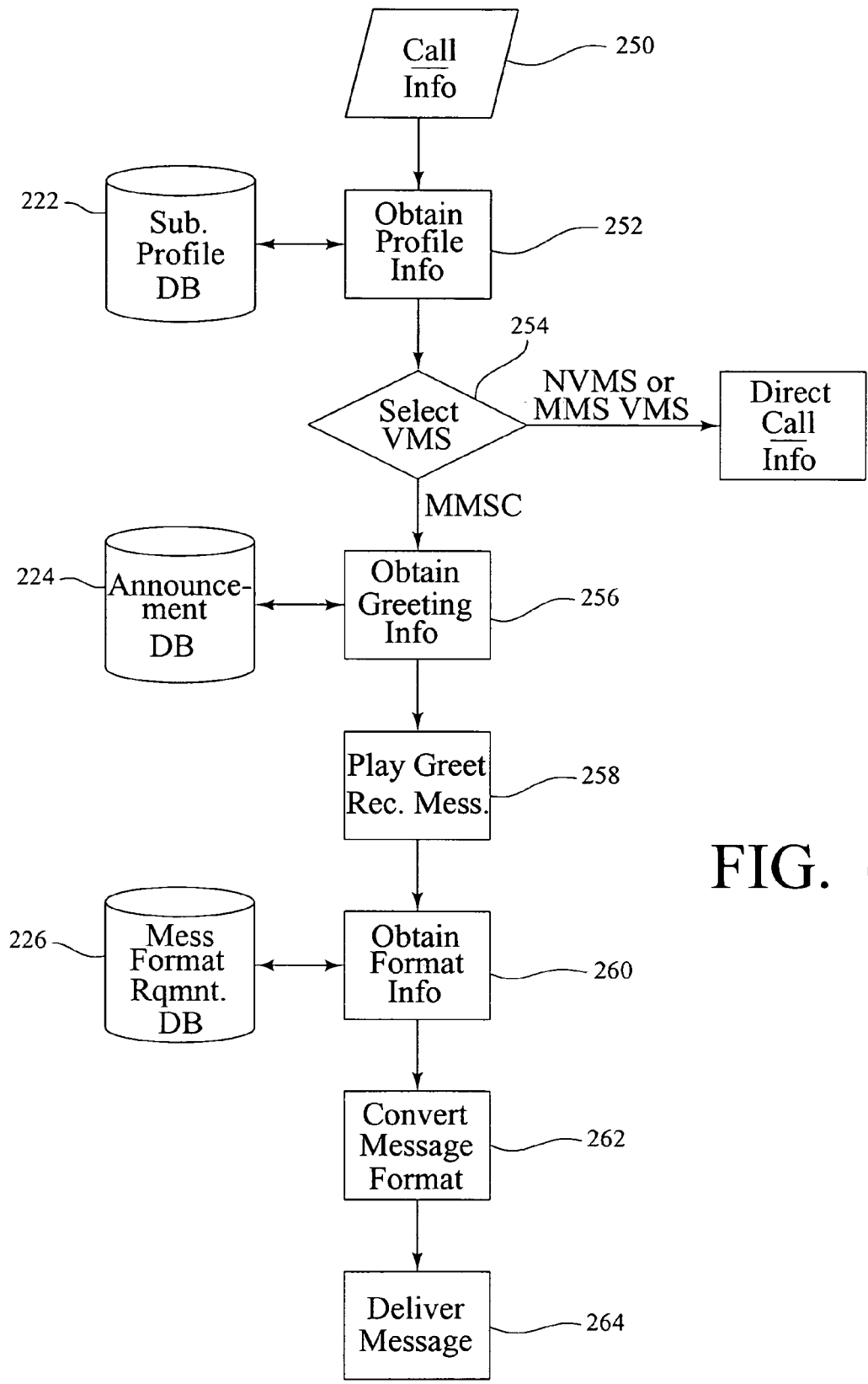
FIG. 6 is a logic flow diagram of another exemplary method of the invention.

FIG. 6 shows the logical flow of a method used in the exemplary system 200 of FIG. 5. In the first step 250, the AMA device 214 receives call information from a communication switch 234, where the call information includes the identity (e.g. the telephone number) of the subscriber to whom the call was placed. In the next step 252, the AMA device 214 queries the subscriber profile database 222 for profile information for the subscriber 232, where the profile information includes voice mail technology platform indicator information for the subscriber. In the next step 254, the AMA device 214 selects a voice mail technology platform using the voice mail technology platform indicator obtained in the previous step 252.

If the NVMS or MMS VMS platform 210 is selected, the call and the call information can then be directed to the NVMS or MMS VMS platform 210.

If the MMSC architecture platform is selected, the greeting player and message recorder element 218 of the AMA device 214 queries the announcement database 224 for personal greeting information for the subscriber 232 in the following step 256. In the next step 258, the greeting player and message recorder element 218 plays the personal greeting to the caller, and records a message for the subscriber. In the succeeding step 260, the content adapter element 220 of the AMA device 214 queries the message format requirement database 226 for message format requirement information for the subscriber 232. In the succeeding step 262, the content adapter element 220 converts the recorded voice mail message to the format indicated by the message format requirement information. In the last step 264, the AMA device 214 delivers the message to the subscriber 232 (or to the subscriber's MMS-capable terminal) through the MMSC architecture platform.

In the above description of the present invention, it should be recognized that the AMA device, including the described elements thereof, and the various database elements may be implemented on digital computing equipment, or the equivalent, through the use of computer programs, or the equivalent. Thus, the method of the invention may be found as executable instructions contained on a computer readable medium.

Thus, the invention provides a system and method for providing voice mail service in an environment having multiple voice mail technology platforms where the voice mail platform can be custom selected based on the various needs of the subscribers and the carriers, as indicated in the subscriber profile database, among other benefits and features.

One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A system for providing voice mail service in a wireless environment having multiple voice mail technologies platforms, said system comprising:
   an automatic message attendant device having a platform selector element;
   a subscriber profile database relating voice mail technology platform indicator information for a plurality of subscribers to corresponding subscriber identities, said subscriber profile database in communication with said platform selector element;
   said platform selector element operative to:
      receive call information regarding a call placed to a subscriber from a caller, said call information including the identity of the subscriber to whom the call was placed;
      obtain voice mail technology platform indicator information for said subscriber from said subscriber profile database utilizing said subscriber identity; and
      use said voice mail technology platform indicator information to select one of said multiple voice mail technologies platforms for receiving said call, formatting a message of said call from said caller to said subscriber, and storing said message on said selected voice mail technology platform for later retrieval.

2. The system of claim 1 further having a common signaling network, said platform selector element in communication with said common signaling network, wherein said platform selector element receives said call information through said common signaling network from a communication switch, and wherein said platform selector element is further operative to provide a routing address for the selected voice mail technology platform to said communication switch through said common signaling network.

3. The system of claim 1 wherein said automatic message attendant device is operative to:
  receive a connection to said caller; and
  connect said caller to said selected voice mail technology platform.

4. The system of claim 1 further having an audio announcement database relating personal greeting information for a plurality of subscribers to corresponding subscriber identities, wherein said automatic message attendant device further has a greeting player and message recorder element, said greeting player and message recorder element in communication with said audio announcement database and said platform selector element, said greeting player and message recorder element operative to:
  obtain personal greeting information for said subscriber from said audio announcement database utilizing said subscriber identity;
  play a greeting to said caller as indicated by said personal greeting information; and
  record a voice mail message from said caller to said subscriber.

5. The system of claim 4 wherein said greeting player and message recorder element is further operative to forward the recorded message to the selected voice mail technology platform.

6. The system of claim 4 further comprising a message format requirement database relating message format requirement information for a plurality of subscribers to corresponding subscriber identities, wherein said automatic message attendant device further has a content adapter element, said content adapter element in communication with said message format requirement database, said content adapter element operative to:
  obtain message format requirement information for said subscriber from said message format requirement database utilizing said subscriber identity; and
  convert said recorded voice mail message to the format indicated by said message format requirement information.

7. The system of claim 6 wherein said content adapter element is further operative to forward the formatted message to the selected voice mail technology platform.

8. A method for providing voice mail service in a wireless environment having multiple voice mail technologies platforms, said method comprising the steps of:
  providing a subscriber profile database which contains voice mail technology platform indicator information associated with a plurality of subscribers;
  receiving information regarding a call from a caller to be directed to a voice mail technology platform, said call information including an identity of the subscriber to whom the call was placed;
  obtaining said voice mail technology platform indicator information from said subscriber profile database utilizing said subscriber identity; and
  using said voice mail technology platform indicator information to select one of said multiple voice mail technologies platforms for receiving said call, formatting a message of said call from said caller to said subscriber, and storing said message on said selected voice mail technology platform for later retrieval.

9. The method of claim 8 further including the step of directing said caller to said selected voice mail technology platform.

10. The method of claim 9 wherein said step of directing the caller to the selected voice mail technology platform includes providing a routing address for the selected voice mail technology platform to a communication switch through a common signaling network.

11. The method of claim 9 wherein said step of directing the caller to the selected voice mail technology platform includes receiving a connection to said caller and connecting said caller to said selected voice mail technology platform.

12. The method of claim 8 further including the steps of:
  obtaining personal greeting information for said subscriber from an announcement database utilizing said subscriber identity;
  playing a greeting to said caller as indicated by said personal greeting information; and
  recording a voice mail message from said caller to said subscriber.

13. The method of claim 12 further including the step of forwarding said recorded message to said selected voice mail technology platform.

14. The method of claim 12 further includes the steps of:
  obtaining message format requirement information for said subscriber from a message format requirement database utilizing said subscriber identity; and
  converting said recorded voice mail message to the format indicated by said message format requirement information.

15. The method of claim 14 further including the step of forwarding said converted message to said selected voice mail technology platform.

16. A system for providing voice mail service in a wireless environment having multiple voice mail technologies platforms, said system comprising:
  a means for relating voice mail technology platform indicator information for a plurality of subscribers to corresponding subscriber identities; and
  a means for:
    receiving information regarding a call from a caller to be directed to a voice mail technology platform, said call information including an identity of the subscriber to whom the call was placed;
    obtaining said voice mail technology platform indicator information from said means for relating voice mail technology platform indicator information; and
    using said voice mail technology platform indicator information to select one of said multiple voice mail technologies platforms for receiving said call, formatting a message of said call from said caller to said subscriber, and storing said message on said selected voice mail technology platform for later retrieval by said subscriber.

17. The system of claim 16 further having:
  a means for relating personal greeting information for a plurality of subscribers to corresponding subscriber identities; and
  a means for:
    obtaining personal greeting information for said subscriber from said means for relating personal greeting information;
    playing a greeting to said caller as indicated by said personal greeting information; and
    recording a voice mail message from said caller to said subscriber.

18. The system of claim 17 further having:
a means for relating message format requirement information for a plurality of subscribers to corresponding subscriber identities; and
a means for:
obtaining message format requirement information for said subscriber from said means for relating message format requirement information; and
converting said recorded voice mail message to the format indicated by said message format requirement information.

19. A computer readable medium having computer executable instructions for performing a method for providing voice mail service in a wireless environment having multiple voice mail technologies platforms comprising the steps of:
receiving information regarding a call from a caller to be directed to a voice mail technology platform, said call information including an identity of the subscriber to whom the call was placed;
obtaining voice mail technology platform indicator information from a subscriber profile database utilizing said subscriber identity; and
using said voice mail technology platform indicator information to select one of said multiple voice mail technologies platforms for receiving said call, formatting a message of said call from said caller to said subscriber, and storing said message on said selected voice mail technology platform for later retrieval by said subscriber.

20. The computer readable medium of claim 19 including executable instructions for performing a method for providing voice mail service in a wireless environment having multiple voice mail technologies platforms, further including the steps of:
obtaining personal greeting information for said subscriber from an announcement database utilizing said subscriber identity;
playing a greeting to said caller as indicated by said personal greeting information; and
recording a voice mail message from said caller to said subscriber.

21. The computer readable medium of claim 20 including executable instructions for performing a method for providing voice mail service in a wireless environment having multiple voice mail technologies platforms, further including the steps of:
obtaining message format requirement information for said subscriber from a message format requirement database utilizing said subscriber identity; and
converting said recorded voice mail message to the format indicated by said message format requirement information.

22. A system for providing voice mail service in a wireless environment having multiple voice mail technologies platforms, said system comprising:
a subscriber profile database relating voice mail technology platform indicator information for a plurality of subscribers to corresponding subscriber identities;
an audio announcement database relating personal greeting information for a plurality of subscribers to corresponding subscriber identities;
an automatic message attendant device having:
a platform selector element in communication with said subscriber profile database, said platform selector element operative to:
receive call information regarding a call placed to a subscriber from a caller, said call information including the identity of the subscriber to whom the call was placed;
obtain voice mail technology platform indicator information for said subscriber from said subscriber profile database utilizing said subscriber identity; and
select a voice mail technology platform by using said voice mail technology platform indicator information; and
a greeting player and message recorder element in communication with said audio announcement database and said platform selector element, said greeting player and message recorder element operative to:
obtain personal greeting information for said subscriber from said audio announcement database utilizing said subscriber identity;
play a greeting to said caller as indicated by said personal greeting information; and
format and record a voice mail message on said selected voice mail technology platform from said caller to said subscriber.

23. The system of claim 22 wherein said greeting player and message recorder element is further operative to forward the recorded message to the selected voice mail technology platform.

24. The system of claim 22 further comprising a message format requirement database relating message format requirement information for a plurality of subscribers to corresponding subscriber identities, wherein said automatic message attendant device further has a content adapter element, said content adapter element in communication with said message format requirement database, said content adapter element operative to:
obtain message format requirement information for said subscriber from said message format requirement database utilizing said subscriber identity; and
convert said recorded voice mail message to the format indicated by said message format requirement information.

25. The system of claim 24 wherein said content adapter element is further operative to forward the formatted message to the selected voice mail technology platform.

* * * * *